(No Model.) 3 Sheets—Sheet 2.

O. R. BALDWIN.
WHEEL HARROW AND CULTIVATOR.

No. 488,597. Patented Dec. 27, 1892.

Witnesses
John Schuman
John F. Miller

Inventor
Orrin R. Baldwin
By his Attorney
Newell S. Wright (No Model.) 3 Sheets—Sheet 3.

O. R. BALDWIN.
WHEEL HARROW AND CULTIVATOR.

No. 488,597. Patented Dec. 27, 1892.

Witnesses
John Schuman
John F. Miller

Inventor
Orrin R. Baldwin
By his Attorney
Newell S. Wright

UNITED STATES PATENT OFFICE.

ORRIN R. BALDWIN, OF DETROIT, MICHIGAN.

WHEEL HARROW AND CULTIVATOR.

SPECIFICATION forming part of Letters Patent No. 488,597, dated December 27, 1892.

Application filed February 4, 1892. Serial No. 420,363. (No model.)

To all whom it may concern:

Be it known that I, ORRIN R. BALDWIN, a citizen of the United States, residing at Detroit, county of Wayne, State of Michigan, have invented a certain new and useful Improvement in a Wheel Harrow and Cultivator; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a wheel harrow and cultivator and consists of the construction, combination and arrangement of devices and appliances hereinafter specified and claimed and illustrated in the accompanying drawings, in which—

Figure 1:
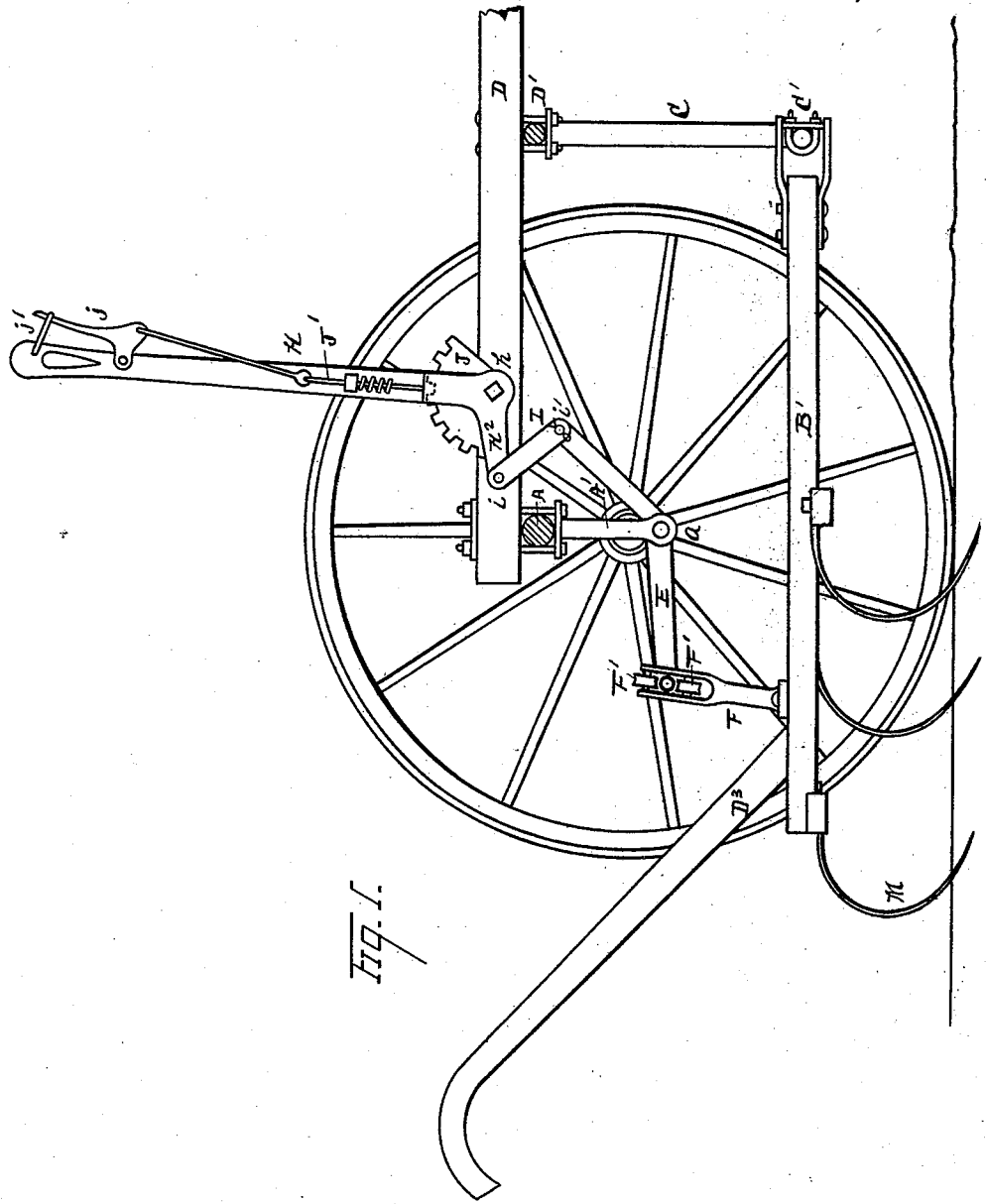
Figure 2:
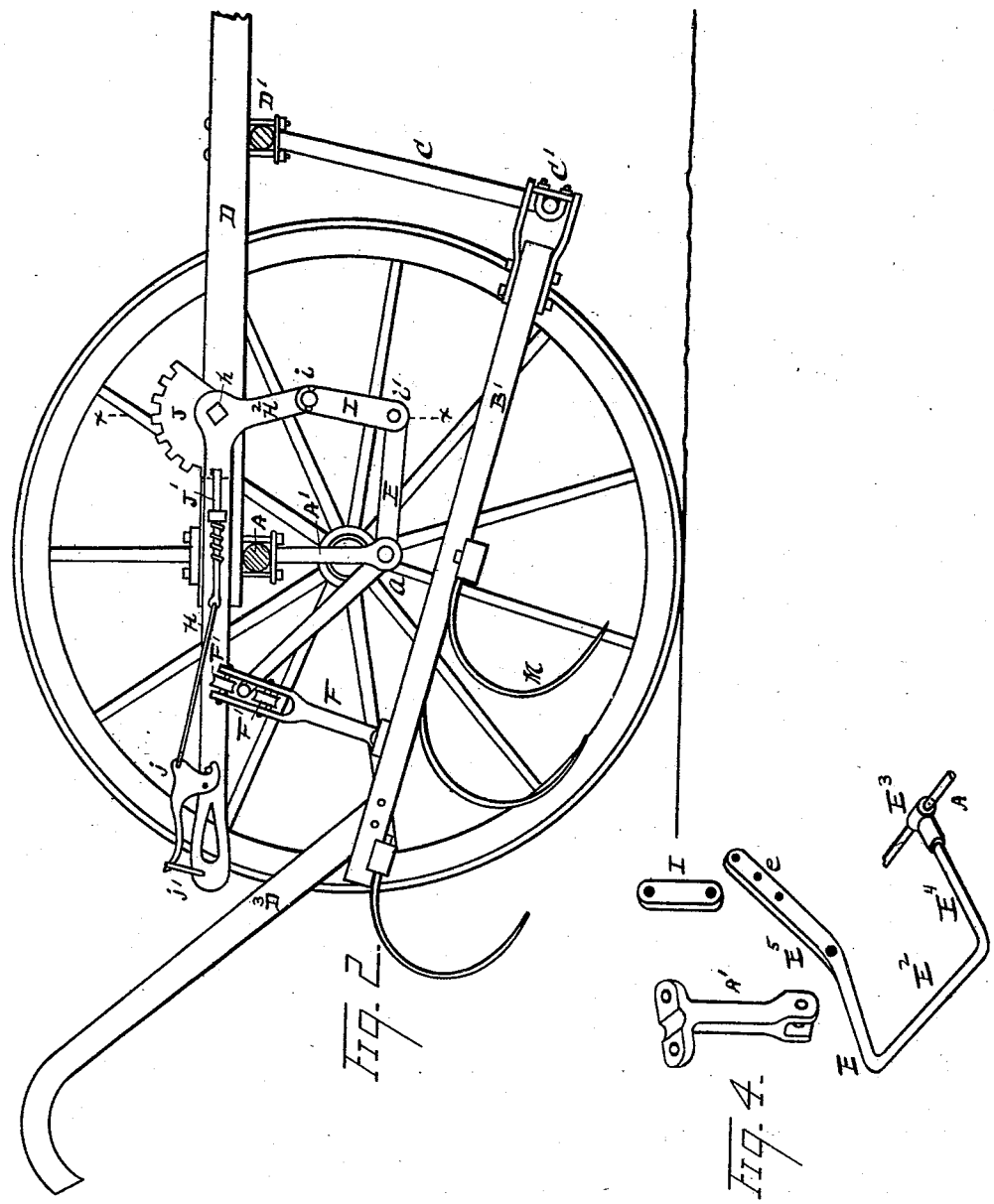
Figure 3:
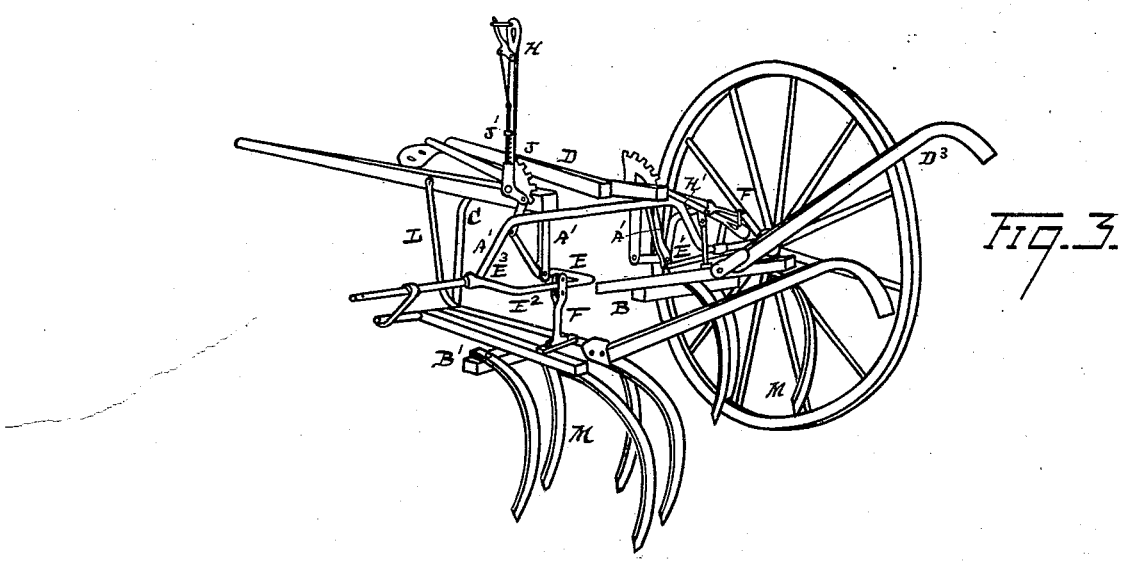
Figures 5, 6:
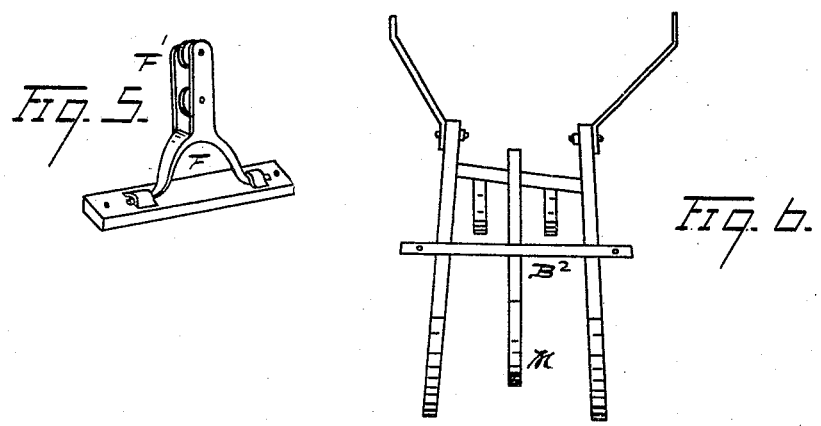

Figure 1 is a vertical section of the device showing one of the wing frames in side elevation, and in a downward position. Fig. 2 is a similar view but showing the wing frame elevated. Fig. 3 is a view in perspective illustrating my invention, showing one of the wing frames down in working position, the other wing frame being in suspended position. Fig. 4 illustrates certain details of the lever arms and immediate connections. Fig. 5 is a separate view of the stirrup. Fig. 6 is a view of a detractible tooth or shovel frame $B^2$.

The object of my invention is to secure increased efficiency in wheel harrows and cultivators, and at the same time greater simplicity and convenience of operation.

To this end I carry out my invention as follows:

A represents the axle, and B B' represent respectively the tooth or shovel bearing frames of two wings of the harrow and cultivator. These frames, at their rear extremities are made laterally and vertically movable in any desired manner. The vertical movement is intended to allow the frames being suitably lifted to carry the teeth out of the ground whenever desired. While also in consequence thereof the teeth may be firmly set in the ground in working position as required. The frames may also have an independent vertical movement so that either may be lifted without lifting the other, as to clear an obstruction if necessary. So also the frames within the scope of my invention may have an independent lateral movement at their rear ends to permit their being moved nearer to or farther from either side of a row to be cultivated thereby. My invention, moreover embraces within its scope the addition of a central tooth or shovel bearing frame $B^2$ when desired, which may be connected between the frame B B' in any desired manner, when the machine is to be used as a harrow. This central frame therefore preferably has a removable connection with the wing frames B B' so as to be used or removed as may be desired. When engaged with the wing frames all the frames B B' $B^2$ may be rigidly connected so that all may be lifted by one and the same operating lever.

In my present invention I do not confine myself to any specific manner of arrangement to allow of the lateral movement of the rear ends of the wing frames. Nor to any definite engagement of the front ends of said frames to other parts of the harrow and cultivator to permit a vertical movement of the rear extremities of the wing frames. As shown, however, herewith the wing frames are each connected at their forward ends to the extremities of an arch C by a hinge and swivel joint C', the arch C being engaged at its upper end with the main frame D of the harrow and cultivator as by a clip D'. The vertical movement of the frames B B' I accomplish by means of lever arms E E' with which the said frames are connected respectively in any suitable manner. Each of the lever arms is preferably constructed with a horizontal extension $E^2$ upon which the adjacent frame may be supported to travel laterally, as by a stirrup F provided with rollers F' engaged upon said arm. One end of each lever arm is here shown having a jointed connection to the axle, as at $E^3$. I do not limit myself however to any definite engagement of the rear end of the lever arm, as it may, within the scope of my invention, have any desired connection with related parts of the harrow and cultivator whereby the frame engaged therewith may be moved vertically thereby.

The opposite end of the lever arm from that spoken of above is carried forward and is shown fulcrumed to an axle connection or bracket A' as shown at "a." The lever arm is projected forward of its fulcrum and thereby so arranged that by elevating and depressing the forward end of the lever arm a corresponding movement will be given to the rear end of the wing frame connected therewith.

The elevation and depression of the forward ends of the lever arms may be accomplished in any desired manner. As shown herewith operating levers H H' are connected with the forward extremities of the lever arms, by a toggle arm connection I jointedly engaged with the arm and operating lever as shown at "$i$" "$i'$."

J is a segmental rack bar, and J' a pawl preferably connected with the operating lever to engage with the rack bar and hold the operating lever in any desired position. The forward extremity of the lever arm may be provided with a series of orifices "$e$" if desired, whereby the toggle arm I may have an adjustable connection therewith.

The operating levers H H' are shown fulcrumed to the main frame as shown at "$h$." The pawl J' is connected with a hand lever "$j$" fulcrumed on the operating lever. The latter may also be provided with a link "$j'$" to hold the hand lever "$j$" out of locked position when desired. The operating levers are each preferably constructed with an angle arm $H^2$, with which the toggle arm is engaged.

The lever arm, as shown, is preferably constructed with one extremity $E^4$ bent inward toward the axle from the horizontal extensions of the arm, while the opposite extremity $E^5$ thereof is bent inward in a similar direction, the extremity $E^5$ being constructed angular, as represented. I do not however confine myself to this construction of the lever arm alone. One feature of my invention respects the arrangement of the lever arm, operating lever and toggle arm in such a manner that the union of the toggle arm and operating lever shown at "$i$" may be thrown past the center or perpendicular, as shown in Fig. 2 to lock the wing frame in a suspended position. This is done by simply throwing over the operating lever into a substantially horizontal position, a convenient and speedy operation. The perpendicular past the center of which the union "$i$" is thus thrown is indicated in the vertical dotted line $x$—$x$ Fig. 2. The wing frame will thus be effectually held in a suspended position until the operating lever is thrown over, and without the necessity of engaging the pawl with the rack bar. It will thus be seen that each of the wing frames may be separately and independently raised and lowered by the manipulation of either of the operating levers H H'. Said levers are arranged on either side of the seat within convenient reach of the driver. They may also be readily reached by the driver on foot if the device is used as a walking harrow or cultivator.

The rack and pawl mechanism permits of any desired regulation of the teeth in the soil.

L denotes suitable brace rods.

M represents teeth or shovels engaged with the tooth bearing frames in any desired manner.

Either teeth or shovels or analogous devices may be engaged with any of the frames B B' $B^2$ within the scope of my invention.

Either of the wing frames may be raised and locked in a suspended position as above described either by means of its operating lever, or by lifting the frame itself as by its handle $D^3$. If the driver is walking it might be more convenient for him to seize the frame without touching the lever to lift the frame into suspended position. In either way the frame could be locked by the union of the toggle arm and lever being thrown past the perpendicular, as shown in Fig. 2. Attention is furthermore called to the fact that the construction herein shown and described is such as to permit the tooth or shovel frames being locked in downward position so as to enter and effectually hold the teeth or shovels in the soil. Thus if the link "$j'$" be disengaged from the hand lever "$j$" the spring pawl will seat in the rack bar in whatever position the operating lever may be thrown, and so hold the frame rigidly in that position. The base of the operating lever being engaged to the lever arm by the toggle arm, consisting of a bar of metal, the parts are locked firmly in position when the pawl is engaged with the rack bar permitting no vertical movement or vibration of the frame without first disengaging the pawl, thus locking the frame in a downward position and holding the teeth or shovels firmly into the soil. I do not limit myself solely to this manner of automatically locking the frame in an upward position as I contemplate such a locking up of the frame in any manner as coming within the scope of my invention.

What I claim as my invention is:

1. In a wheel cultivator, the combination with the main frame and axle, of a lever arm pivotally secured to the axle, the rear portion of which is provided with a lateral extension, a shovel frame jointedly suspended from the main frame at its front end, and from the lateral extension of said lever arm toward the rear end, and laterally vibratory on said lateral extension, and an operating lever to engage with said lever arm adapted thereby to elevate and lower the shovel frame, substantially as set forth.

2. In a wheel cultivator, the combination with the main frame, of a shovel frame jointedly suspended at its forward end therefrom, a lever arm pivotally secured to the axle of the cultivator, the rear end of which is provided with a lateral extension, a lever for operating said arm, a toggle arm jointedly connecting the said lever arm and operating lever whereby the lower end of the operating lever may be thrown past the center to lock the frame in an upward position, said cultivator frames being provided with handles, the construction of the whole being such that a driver by seizing said handles may throw the cultivator frame into a locked upward position, without grasping the operating lever, substantially as set forth.

3. In a wheel cultivator, the combination with the main frame, of the shovel frame flexibly suspended therefrom at its front end whereby it may be moved longitudinally thereto, a lever arm pivotally secured to the axle, the rear end of which is provided with a lateral extension, a link pivotally secured to the shovel frame at its lower end and engaging with and laterally movable upon the extension of the lever arm, and a lever for operating the front end of said lever arm, substantially as set forth.

In testimony whereof I sign this specification in the presence of two witnesses.

ORRIN R. BALDWIN.

Witnesses:
N. S. WRIGHT,
JOHN F. MILLER.